United States Patent
Huang et al.

(10) Patent No.: US 11,671,799 B2
(45) Date of Patent: Jun. 6, 2023

(54) METHOD AND DEVICE FOR COMMUNICATING MESSAGES WITHIN A 5G NETWORK

(71) Applicant: Verizon Patent and Licensing Inc., Basking Ridge, NJ (US)

(72) Inventors: Ye Huang, San Ramon, CA (US); Miguel A. Carames, Long Valley, NJ (US); Kalyani Bogineni, Irving, TX (US); Timothy M. Dwight, Richardson, TX (US); Kevin Lim, Danville, CA (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/592,948

(22) Filed: Feb. 4, 2022

(65) Prior Publication Data

US 2022/0159421 A1    May 19, 2022

Related U.S. Application Data

(60) Division of application No. 16/831,103, filed on Mar. 26, 2020, now Pat. No. 11,265,686, which is a continuation-in-part of application No. 16/777,041, filed on Jan. 30, 2020, now Pat. No. 11,337,044, which is a continuation of application No. 16/228,180, filed on Dec. 20, 2018, now Pat. No. 10,582,349.

(51) Int. Cl.
*H04W 4/18* (2009.01)
*H04W 4/14* (2009.01)
*H04L 51/234* (2022.01)

(52) U.S. Cl.
CPC ............. *H04W 4/18* (2013.01); *H04L 51/234* (2022.05); *H04W 4/14* (2013.01)

(58) Field of Classification Search
CPC ........... H04W 4/18; H04W 4/14; H04W 4/12; H04L 51/34; H04L 51/38; H04L 51/066
See application file for complete search history.

(56) References Cited

U.S. PATENT DOCUMENTS

| | | |
|---|---|---|
| 8,755,404 B2 | 6/2014 | Viswanathan et al. |
| 2002/0087704 A1 | 7/2002 | Chesnais et al. |
| 2002/0159476 A1 | 10/2002 | Daly et al. |
| 2003/0187930 A1 | 10/2003 | Ghaffar et al. |
| 2004/0181550 A1 | 9/2004 | Warsta et al. |
| 2007/0191035 A1 | 8/2007 | Huggett |
| 2008/0005227 A1 | 1/2008 | Subbian |

(Continued)

*Primary Examiner* — Mazda Sabouri

(57) ABSTRACT

A device may receive, from an application function device (AF), a message intended for a destination user device, wherein the message conforms to a first format. The device may obtain, from a unified data management device (UDM), information indicating that the destination user device is capable of receiving messages that conform to a second format. The device may convert, based on the information indicating that the destination user device is capable of receiving messages that conform to the second format, the message from the first format to the second format. The device may send, after converting the message from the first format to the second format, the message to a short message service function device (SMSF) via a direct connection between the device and the SMSF, wherein the SMSF sends the message to the destination user device.

20 Claims, 12 Drawing Sheets

(56) References Cited

U.S. PATENT DOCUMENTS

| | | |
|---|---|---|
| 2008/0243619 A1 | 10/2008 | Sharman et al. |
| 2012/0072529 A1 | 3/2012 | Ahopelto |
| 2012/0094637 A1 | 4/2012 | Jeyaseelan et al. |
| 2013/0080553 A1 | 3/2013 | Rosen et al. |
| 2013/0142119 A1 | 6/2013 | Wong |
| 2016/0174219 A1 | 6/2016 | Patil et al. |
| 2016/0269164 A1 | 9/2016 | Jiang et al. |
| 2017/0331588 A1 | 11/2017 | Anyuru et al. |
| 2018/0279115 A1 | 9/2018 | Tanna |
| 2018/0324671 A1 | 11/2018 | Palnati et al. |
| 2018/0343601 A1 | 11/2018 | Livanos |
| 2019/0053104 A1 | 2/2019 | Qiao et al. |
| 2019/0159238 A1 | 5/2019 | Kim et al. |
| 2019/0394712 A1 | 12/2019 | Ronneke |
| 2020/0053686 A1 | 2/2020 | Edge et al. |

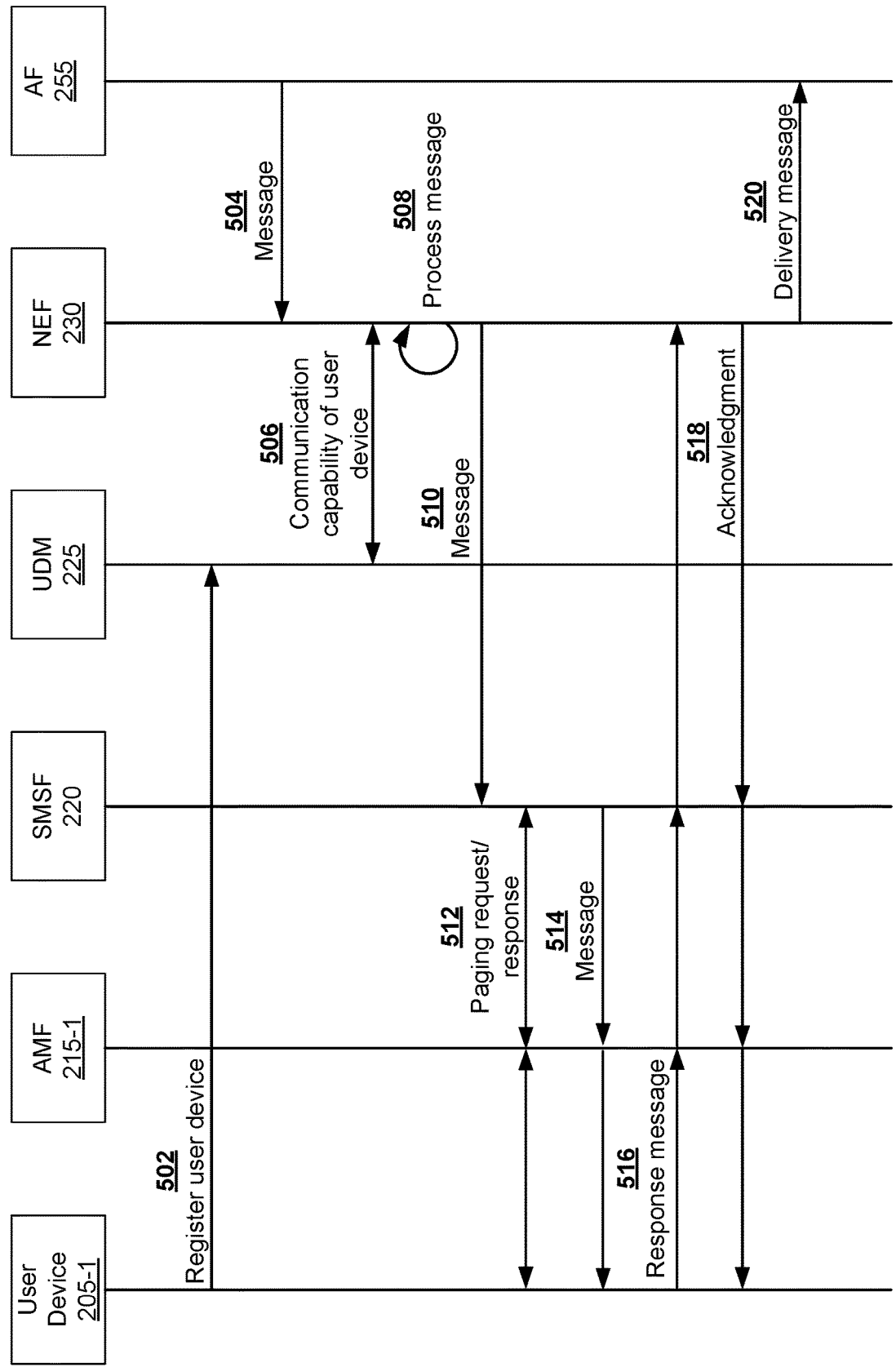

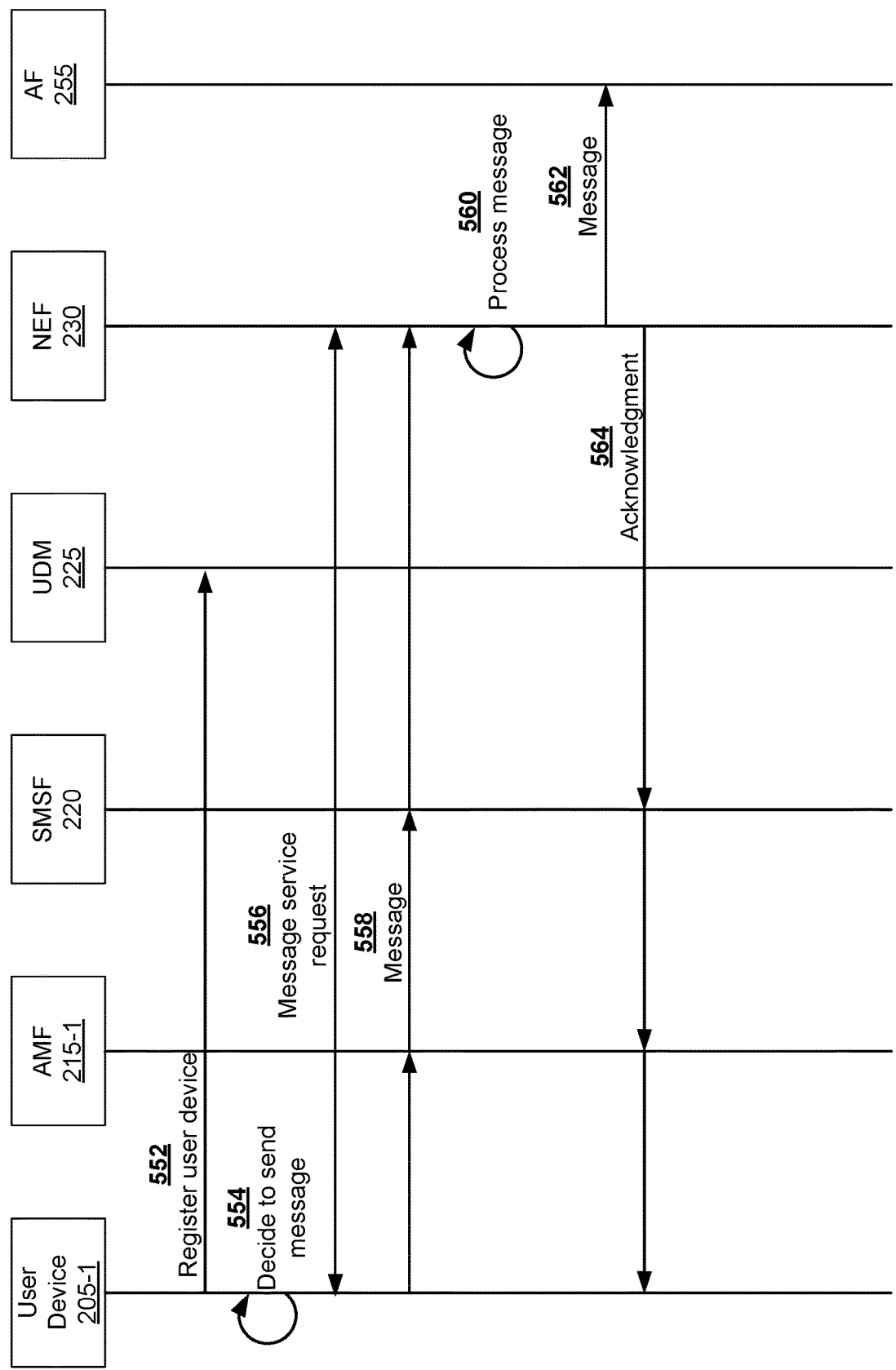

METHOD AND DEVICE FOR COMMUNICATING MESSAGES WITHIN A 5G NETWORK

RELATED APPLICATIONS

This application is a divisional of U.S. patent application Ser. No. 16/831,103, entitled "METHOD AND DEVICE FOR COMMUNICATING MESSAGES WITHIN A 5G NETWORK," filed Mar. 26, 2020, which is a continuation-in-part (CIP) of U.S. patent application Ser. No. 16/777,041, entitled "METHOD AND DEVICE FOR COMMUNICATING MESSAGES VIA A 5G NETWORK," filed on Jan. 30, 2020, which is a continuation of U.S. patent application Ser. No. 16/228,180, entitled "METHOD AND DEVICE FOR COMMUNICATING MESSAGES VIA A 5G NETWORK," filed Dec. 20, 2018 (now U.S. Pat. No. 10,582,349), the contents of all of which are incorporated herein by reference in their entireties.

BACKGROUND

Short message service (SMS) is commonly known as text messaging. An SMS message may be sent from one user device to another user device via one or more wireless telecommunications systems, such as a long term evolution (LTE) wireless telecommunications system, a 3G wireless telecommunications system, a 4G wireless telecommunications system, an LTE-Advanced (LTE-A) wireless telecommunications system, a 5G wireless telecommunications system, and/or the like.

BRIEF DESCRIPTION OF THE DRAWINGS

FIGS. 5A-5B are diagrams of call flows of example operations capable of being performed by one or more devices of FIG. 2 and/or one or more components of one or more devices of FIG. 2.

DETAILED DESCRIPTION OF PREFERRED EMBODIMENTS

Figure 1A:
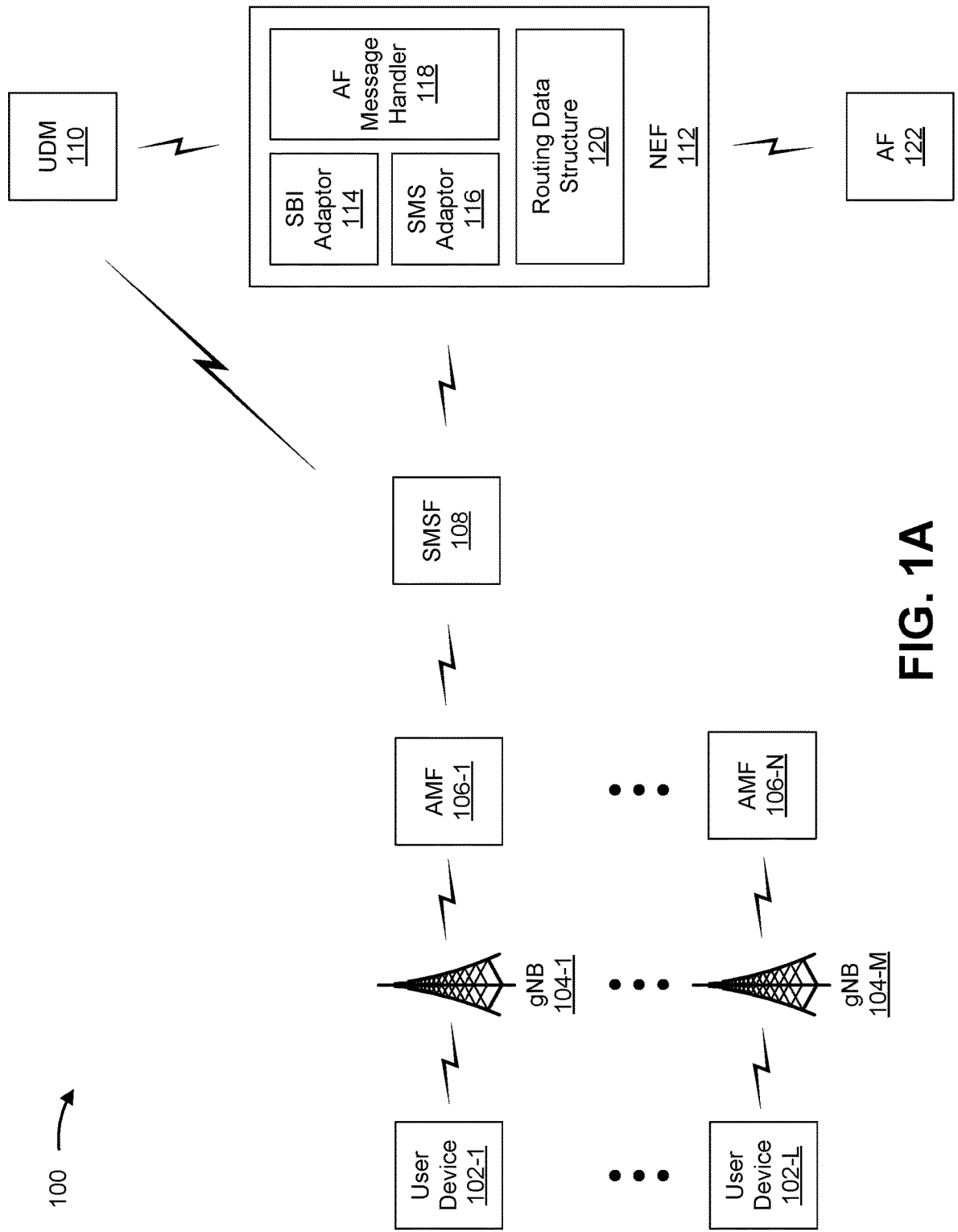
FIGS. 1A-1F are diagrams of one or more example implementations described herein.

The following detailed description of example implementations refers to the accompanying drawings. The same reference numbers in different drawings may identify the same or similar elements.

To support text messaging, a 5G telecommunications system includes a short message service (SMS) function device (SMSF) to enable SMS messages to be transmitted through the 5G telecommunications system. In many cases, however, to transmit an SMS message to a destination user device, the SMSF sends an SMS message to a short message service center device (SMSC) of another telecommunications system, such as a long term evolution (LTE) telecommunications system, which sends the SMS to another device, such as a network exposure function device (NEF), of the 5G telecommunications system. Consequently, currently sending an SMS message using the SMSF is convoluted and causes excessive status messages (at least about nine additional status messages) to be transmitted between different network devices of the 5G telecommunications system. In many cases, this increases the complexity of identifying network device issues because it is hard to determine an origination point of an SMS messaging error. Moreover, transmitting SMS messages across telecommunications systems can affect latency and/or other quality of service characteristics associated with transmitting the SMS messages.

Some implementations described herein provide a network exposure device (e.g., a network exposure function (NEF)) that communicates messages, including SMS messages, with a message transmission device (e.g., an SMSF) via a direct connection between the network exposure device and the message transmission device (e.g., without communicating with a SMSC of another telecommunications system). In some implementations, the network exposure device may receive a message intended for a destination user device and/or an application function (AF). In some implementations, when the message is intended for the destination user device, the network exposure device may process the message based on at least one communication capability of the destination user device (e.g., by converting the message into a format that the destination user device is capable of receiving). In some implementations, the network exposure device may send the message to the message transmission device via the direct connection and the message transmission device may send the message to the destination user device. In some implementations, when the message is intended for the AF, the network exposure device may process the message (e.g., by converting the message into a format that complies with an interface format used by an interface between the network exposure device and the AF) and may send the message to the AF.

In this way, some implementations provide a network exposure device that allows standard network devices to communicate messages within a 5G telecommunication system (e.g., without the messages being communicated to or from another telecommunications system). Accordingly, messages may be more directly routed via the network devices, which may reduce the amount of status messages that need to be communicated between the network devices to send and/or receive a message. This may reduce usage of network device resources (e.g., processor resources, memory resources, communication resources, power resources, and/or the like) to communicate the messages. Furthermore, this allows numerous types of messages, not just SMS messages, to be communicated via the 5G telecommunications system in a uniform, predictable way. This may also allow user devices and/or AFs to communicate messages that are optimized for 5G telecommunications, which may further reduce usage of network devices resources.

FIGS. 1A-1F are diagrams of one or more example implementations 100 described herein. Example implementation(s) 100 illustrate various portions of a wireless telecommunications systems, such as a 5G wireless telecommunications system. As shown in FIG. 1A, example implementation(s) 100 may include one or more user devices (shown as user devices 102-1 through 102-L) connected to one or more radio access networks (RANs) at one or more base stations (shown as gNB 104-1 through 104-M), such as one or more gNBs associated with a 5G telecommunications system. For example, a first set of user devices (e.g., one or more user devices 102-1) may be wirelessly connected with gNB 104-1 and a second set of user devices (e.g., one or more user devices 102-L) may be wirelessly connected with gNB 104-M. In some implementations, a user device of the one or more user devices may have at least one communication capability. For example, a communication capability may have a capability to send and receive messages that conform to one or more formats, such as a non-access stratum (NAS) format, a short message service (SMS) format, a service based interface (SBI) format (e.g., a format suitable for being transmitted via an SBI), a representational state transfer (REST) application programming interface (API) format, and/or the like.

As further shown in FIG. 1A, a base station of the one or more base stations may be connected to an access management network device (shown as AMF 106-1 through 106-N), such as an access and mobility management function (AMF) associated with the 5G telecommunications system. For example, gNB 104-1 may be connected to AMF 106-1 and gNB 104-M may be connected to AMF 106-N. In some implementations, an access management network device may communicate with a set of user devices, of the one or more user devices, via a base station of the one or more base stations. In some implementations, the access management network device may communicate with the set of user devices to determine, for each user device of the set of user devices, information concerning a reachability of the user device. In some implementations, the information concerning the reachability of the user device may include a reachability status of the user device (e.g., whether the user device is active, awake, asleep, idle, connected, and/or the like); a reachability time of the user device (e.g., a time when the user device is reachable, a duration of time the user device is reachable, a reachability start time of the user device, a reachability end time of the user device, a schedule of when the user device is reachable and/or for how long, and/or the like); and/or the like. In some implementations, the access management network device may store the information concerning the reachability of the user device.

As further shown in FIG. 1A, the access management network device may be connected to a message transmission device (shown as SMSF 108), such as an SMS function (SMSF) associated with the 5G telecommunications system. In some implementations, the message transmission device may facilitate transmission of messages to and from the one or more user devices, as described herein. In some implementations, the message transmission device may be connected to a data management network device (shown as UDM 110), such as a unified data management (UDM) associated with the 5G telecommunications system. In some implementations, the data management network device may store information concerning the communication capabilities of the one or more user devices. For example, the information may include, for at least one user device of the one or more user devices, at least one communication capability of the user device.

In some implementations, the message transmission device may be connected to a network exposure device (shown as NEF 112), such as a network exposure function (NEF) associated with the 5G telecommunications system. In some implementations, the network exposure device may include one or more components (shown as SBI adaptor 114, SMS adaptor 116, AF message handler 118, and routing data structure 120) for facilitating transmission of messages from and to the network exposure device, such as an SBI adaptor for facilitating transmission of SBI messages, such as REST API messages, an SMS adaptor for facilitating transmission of SMS messages, an AF message handler for facilitating transmission of messages to an application network device, a routing data structure for storing messages, and/or the like. In some implementations, the one or more components may be separate from each other and/or separate from the network exposure device (e.g., each component of the one or more components may be a separate device that may or may not be connected to the network exposure device).

In some implementations, the network exposure device may be directly connected to the message transmission device and/or the data management network device. For example, NEF 112 may be directly connected to SMSF 108 and/or UDM 110. In some implementations, the network exposure device may be connected to the message transmission device and/or the data management network device via respective SBIs, REST APIs, and/or the like. In some implementations, the network exposure device may be directly connected to the application network device (shown as AF 122), such as an application function (AF) associated with the 5G telecommunications system. In some implementations, the network exposure device may be directly connected to the application network device via an SBI, a REST API, a T8 interface, and/or the like.

Figure 1B:
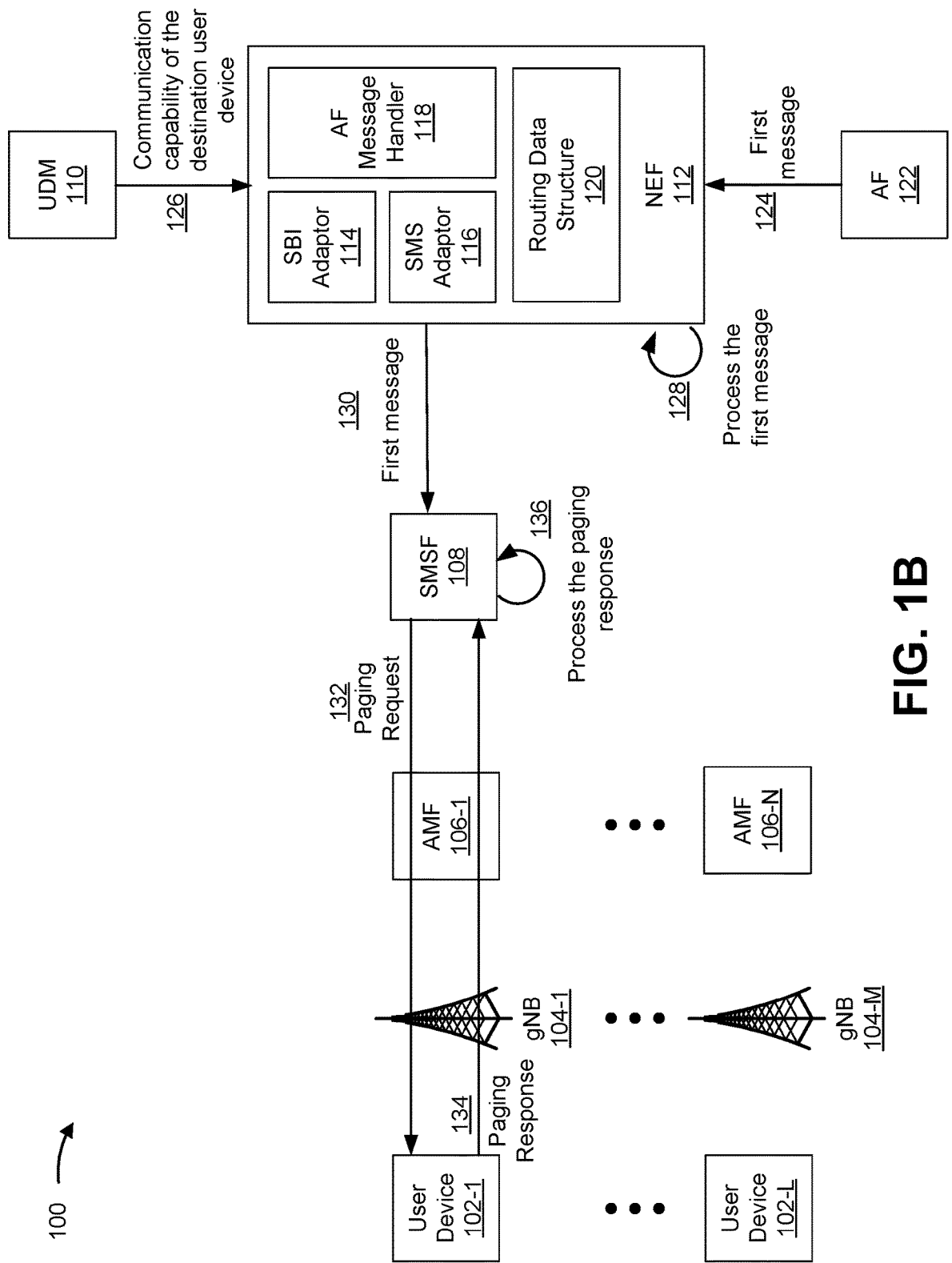

As shown in FIG. 1B and by reference number 124, the application network device (e.g., AF 122) may send a first message to the network exposure device (e.g., NEF 112). In some implementations, the first message may be intended for a destination user device (e.g., user device 102-1). In some implementations, the first message may conform to a REST API format, an SBI format, a T8 format (e.g., a format suitable for being transmitted via a T8 interface), and/or the like. For example, the first message may be a REST API message, an SBI message, a T8 message, and/or the like. In some implementations, the network exposure device may receive the first message from the application network device.

As shown by reference number 126, the network exposure device may obtain information indicating at least one communication capability of the destination user device. In some implementations, the information may indicate that the destination user device is capable of receiving messages that conform to a particular format, such as an NAS format, an SMS format, an SBI format, a REST API format, and/or the like. In some implementations, the network exposure device may obtain the information from the data management network device (e.g., UDM 110). For example, the network exposure device may send a query to the data management network device concerning a messaging capability of the destination user device. The data management network device may process the query and determine a response that indicates that the destination user device is capable of sending and/or receiving messages that conform to the particular format. The data management network device may send the response to the network exposure device.

As shown by reference number 128, the network exposure device (e.g., NEF 112) may process (e.g., using the AF message handler 118) the first message (e.g., to change, modify, update, and/or the like the first message). In some implementations, the network exposure device may convert the first message from a first format to a second format (e.g., based on the information indicating the at least one communication capability of the destination user device). For example, the network exposure device may convert the first message from an SBI format, a REST API format, and/or the like to a NAS format, an SMS format, and/or the like based on information indicating that the destination user device is capable of receiving messages that conform to the NAS format, the SMS format, and/or the like. In this way, the network exposure device may cause the first message to conform to a particular format that the destination user device is capable of receiving, decoding, processing, and/or the like.

In some implementations, the network exposure device may determine (e.g., based on the information indicating the at least one communication capability of the destination user device or other information associated with the user device) a location associated with the destination user device (e.g., a physical location of the destination user device, a location in the 5G telecommunications system, and/or the like). The network exposure device may select, based on the location associated with the destination user device, a message transmission device (e.g., SMSF 108), of one or more message transmission devices, to receive the first message.

As shown by reference number 130, the network exposure device (e.g., NEF 112) may send the first message (e.g., after processing the first message) to the message transmission device (e.g., SMSF 108, the selected message transmission device) via the direct connection between the network exposure device and the message transmission device. In some implementations, the network exposure device may use one or more components, such as the SBI adaptor (e.g., SBI adaptor 114) and/or the SMS adaptor (e.g., SMS adaptor 116), to send the first message. For example, when the first message is a REST API message, the network exposure device may send the first message to the message transmission device using the SBI adaptor. As another example, when the first message is an SMS message (e.g., an SMS TPDU message), the network exposure device may send the first message to the message transmission device using the SMS adaptor. In some implementations, the network exposure device may add the first message to a payload of a message that conforms to a particular format (e.g., an SBI format, a REST API format, a NAS format, an SMS format, and/or the like) before sending the first message to the message transmission device. For example, the message transmission device may add the first message to a payload of an SBI message, a REST API message, a NAS message, an SMS message, and/or the like.

As shown by reference number 132, the message transmission device may generate (e.g., based on receiving the first message) a paging request and may send the paging request to the destination user device (e.g., user device 102-1). For example, the message transmission device may send the paging request to the access management network device (e.g., AMF 106-1) associated with the destination user device, which may send the paging request to the base station associated with the destination user device (e.g., gNB 104-1), which may send the paging request to the destination user device (e.g., user device 102-1). In some implementations, the paging request may indicate that the message transmission device will send the first message to the destination user device (e.g., after receiving a paging response from the destination user device).

As shown by reference number 134, the destination user device may determine (e.g., based on the paging request) a paging response and send the paging response to the message transmission device (e.g., SMSF 108). For example, the destination user device may send the paging response to the base station (e.g., gNB 104-1), which may send the paging response to the access management network device (e.g., AMF 106-1), which may send the paging response to the message transmission device (e.g., SMSF 108). In some implementations, the paging response indicates that the destination user device is ready to receive the first message (e.g., that the destination user device is reachable). For example, the paging response may indicate that the destination user device is not communicating with any other network devices (and therefore has bandwidth to receive the first message).

As shown by reference number 136, the message transmission device may process the paging response. In some implementations, the message transmission device may process the paging response to determine that the message transmission device is to send the first message to the destination user device (e.g., user device 102-1). For example, the message transmission device may determine, based on the paging response, that the destination user device is ready to receive the first message via the access management network device (e.g., AMF 106-1) and/or the base station (e.g., gNB 104-1).

Figure 1C:
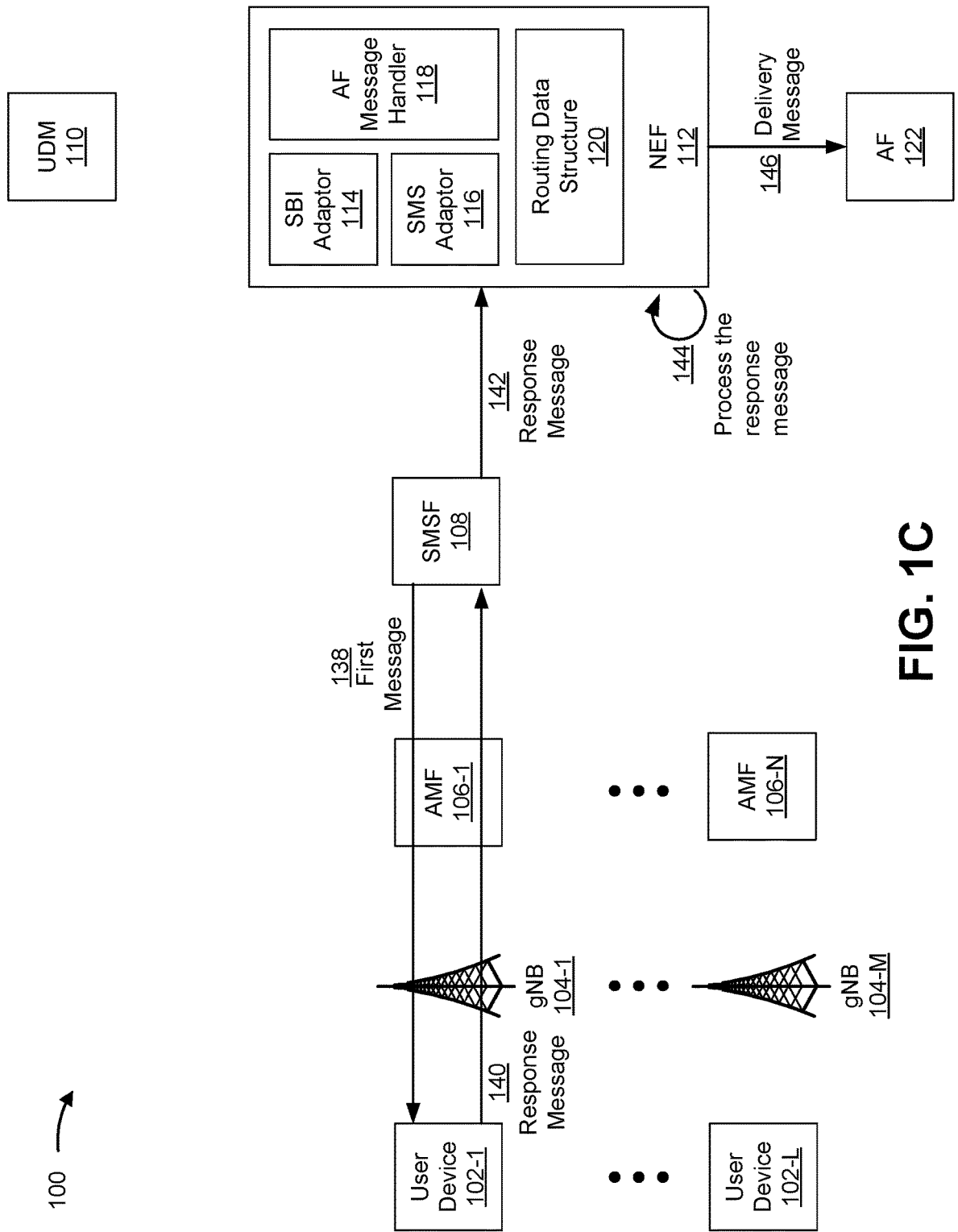

As shown in FIG. 1C and by reference number 138, the message transmission device (e.g., SMSF 108) may send the first message to the destination user device (e.g., user device 102-1). For example, the message transmission device may send the first message to the access management network device associated with the destination user device (e.g., AMF 106-1), which may send the first message to the base station associated with the destination user device (e.g., gNB 104-1), which may send the first message to the destination user device (e.g., user device 102-1).

As shown by reference number 140, the destination user device may generate a response message and may send the response message to the message transmission device (e.g., SMSF 108). For example, the destination user device may send the response message to the base station associated with the destination user device (e.g., gNB 104-1), which may send the response message to the access management network device associated with the destination user device (e.g., AMF 106-1), which may send the response message to the message transmission device (e.g., SMSF 108). In some implementations, the response message may include information indicating receipt of the first message by the destination user device. For example, the response may indicate that the destination user device received the first message, decoded the first message, processed the first message, and/or the like.

As shown by reference number 142, the message transmission device may send the response message to the network exposure device (e.g., NEF 112) via the direct connection between the message transmission device and the network exposure device. As shown by reference number 144, the network exposure device may process the response message. For example, the network exposure device may determine, based on the response message, that the destination user device received, decoded, processed, and/or the like the first message. As shown by reference number 146, the network exposure device may generate and send, based on the response message, a delivery message to the application network device (e.g., AF 122). The delivery message may indicate whether the destination user device successfully received, decoded, processed, and/or the like the first message.

Figure 1D:
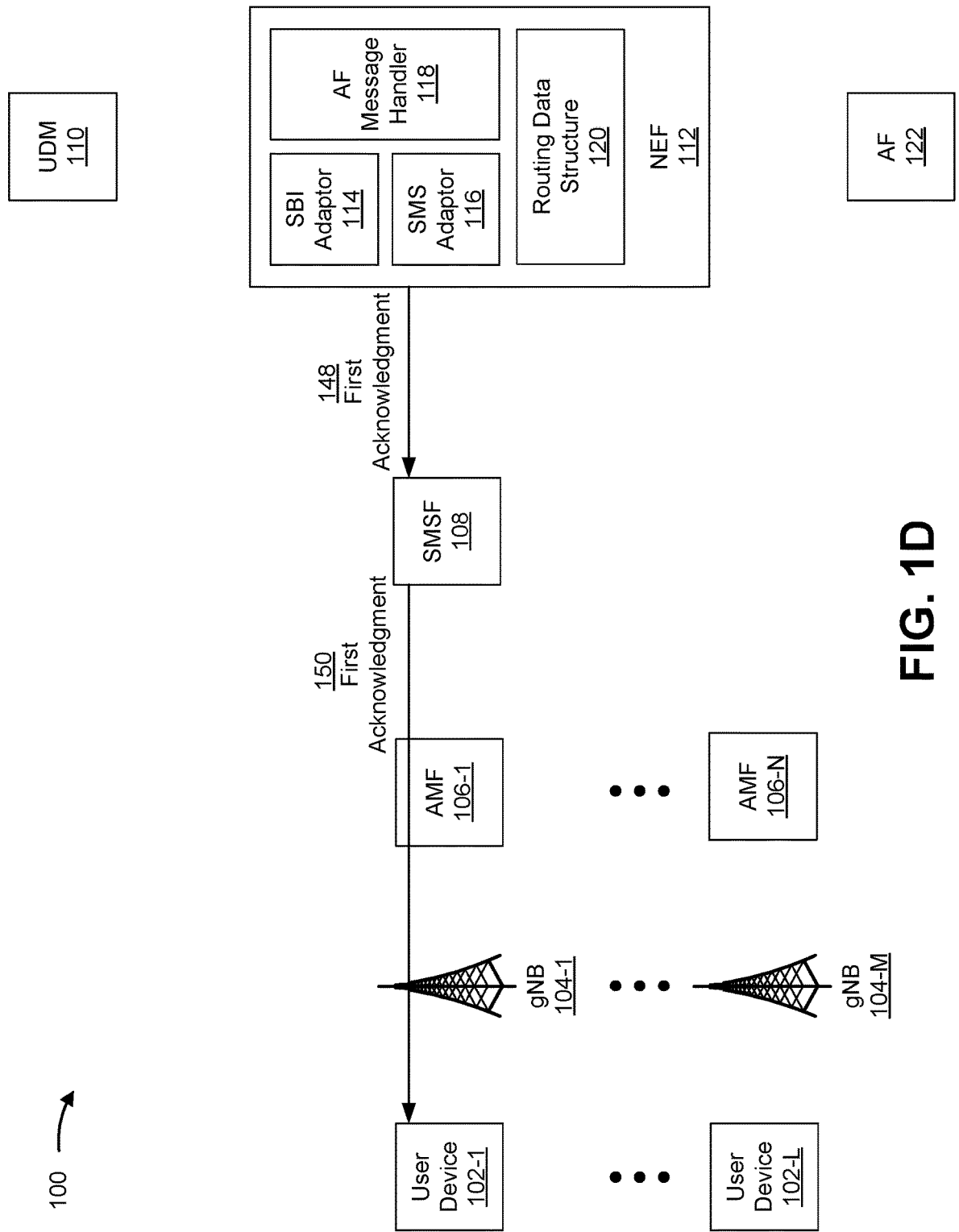

As shown in FIG. 1D and by reference number 148, the network exposure device (e.g., NEF 112) may generate a first acknowledgment (e.g., indicating that the network exposure device received the response message and/or that the network exposure device processed the response message) and send the first acknowledgment to the message transmission device (e.g., SMSF 108) via the direct connection between the network exposure device and the message transmission device. As shown by reference number 150, the message transmission device may send the first acknowledgment to the destination user device. For example, the message transmission device may send the first acknowledgment to the access management network device associated with the destination user device (e.g., AMF 106-1), which may send the first acknowledgment to the base station associated with the destination user device (e.g., gNB 104-1), which may send the first acknowledgment to the destination user device (e.g., user device 102-1).

Figure 1E:
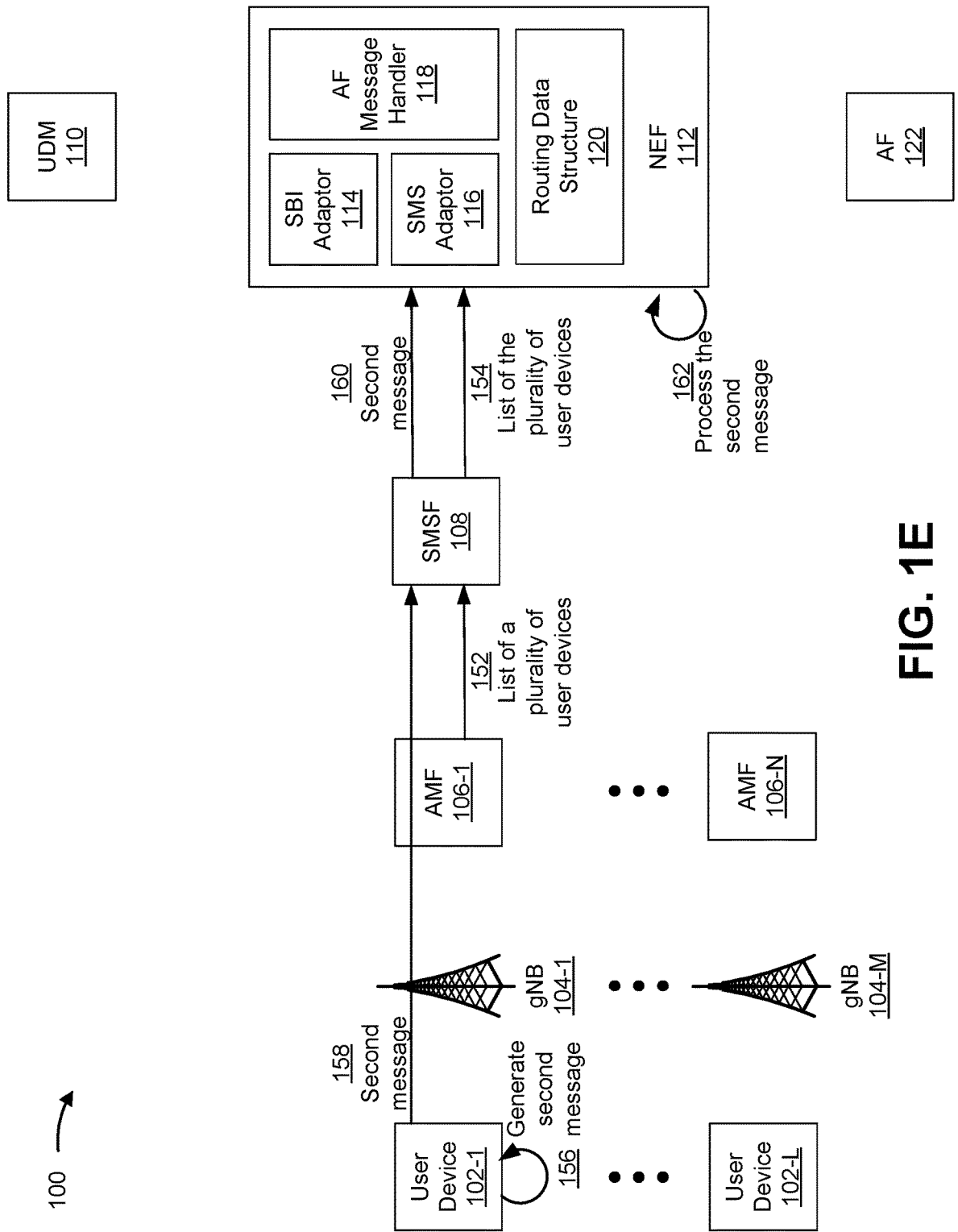

As shown in FIG. 1E and by reference number 152, an access management network device (e.g., AMF 106-1) may send a list of a plurality of user devices to the message transmission device (e.g., SMSF 108). The list of the plurality of user devices may indicate a respective reachability of at least one user device of the plurality of user devices (e.g., user devices 102-1 through 102-L). For example, the list of the plurality of user devices may include information concerning the reachability of a user device, such as the reachability status of the user device, the at least one time during which the user device is reachable, and/or the like. As shown by reference number 154, the message transmission device may send the list of the plurality of user devices to the network exposure device (e.g., NEF 112) via the direct connection between the message transmission device and the network exposure device. In some implementations, the network exposure device may store the list of the plurality of user devices in a data structure (e.g., routing data structure 120).

As shown by reference number 156, an originating user device (e.g., user device 102-1) may generate a second message. For example, a user of the originating user device may enter information into the originating user device, via a user interface of the originating user device, to cause the user device to generate the second message. In some implementations, the second message may conform to a NAS format, an SMS format, an SBI format, a REST API format, and/or the like. For example, the first message may be an NAS message, an SMS message, an SMS transfer protocol data unit (TPDU) message, an SBI message, a REST API message, a REST API message that includes an SMS TPDU message, and/or the like. In some implementations, the second message may be intended for a destination user device (e.g., another user device other than the originating user device, such as user device 102-L). Additionally, or alternatively, the second message may be intended for the application network device (e.g., AF 122). In some implementations, the second message may include information that indicates whether the second message is intended for the destination user device, the application network device, and/or the like.

As shown by reference number 158, the originating user device may send the second message to the message transmission device (e.g., SMSF 108). For example, the originating user device may send the second message to a base station associated with the originating user device (e.g., gNB 104-1), which may send the second message to an access management network device associated with the originating user device (e.g., AMF 106-1), which may send the second message to the message transmission device.

As shown by reference number shown by reference number 160, the message transmission device may send the second message to the network exposure device (e.g., NEF 112) via the direct connection between the message transmission device and the network exposure device. As shown by reference number 162, the network exposure device may process the second message. For example, the network exposure device may determine whether the second message is intended for the destination user device (e.g., user device 102-L) and/or the application network device (e.g., AF 122).

Figure 1F:
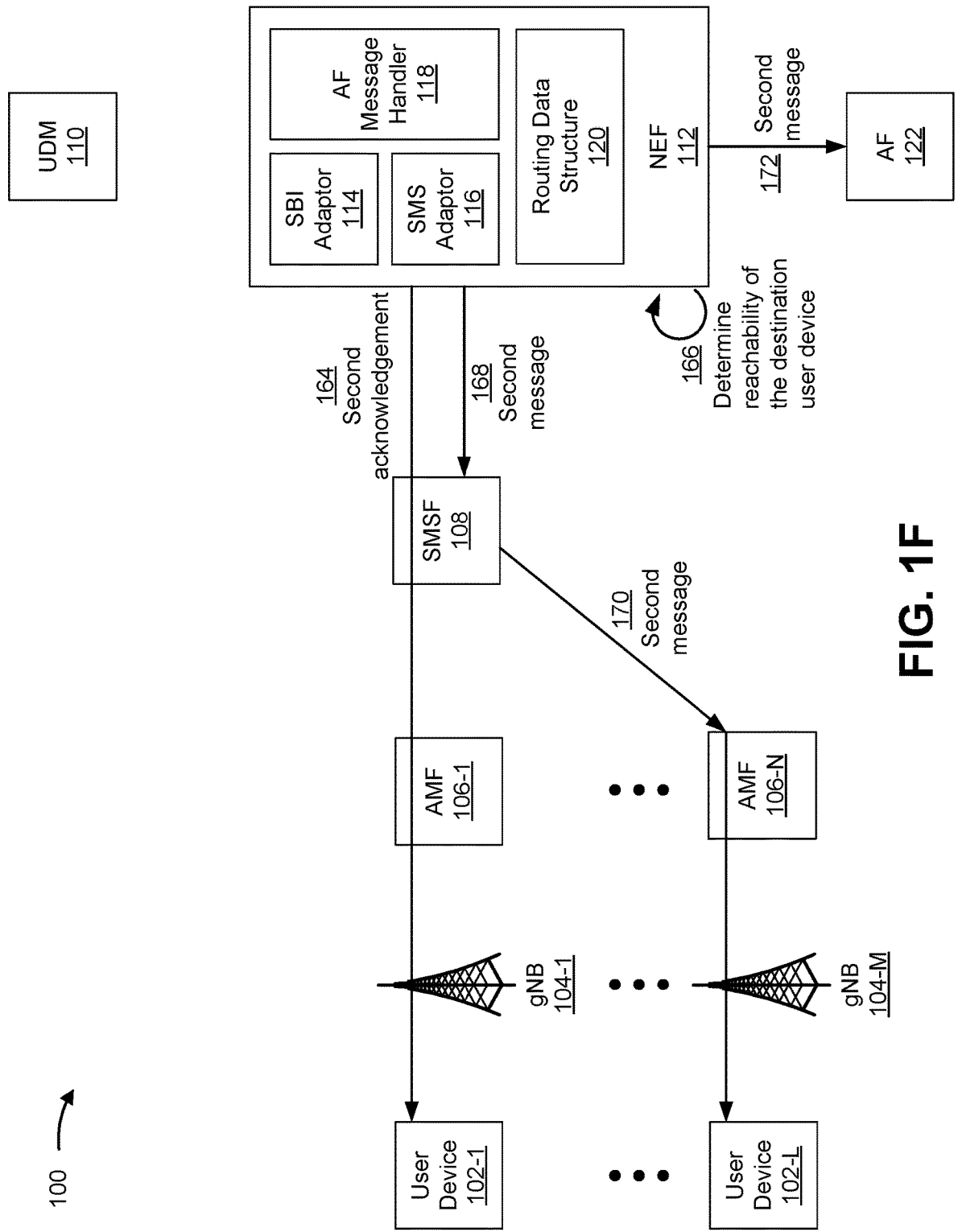

As shown in FIG. 1F and by reference number 164, the network exposure device may generate a second acknowledgment (e.g., indicating that the network exposure device received the second message and/or that the network exposure device processed the second message) and may send the second acknowledgment to the originating user device (e.g., user device 102-1). For example, the network exposure device may send the first acknowledgment to the message transmission device (e.g., SMSF 108) via the direct connection between the network exposure device and the message transmission device, which may send the first acknowledgment to the access management network device (e.g., AMF 106-1), which may send the first acknowledgment to the base station (e.g., gNB 104-1), which may send the first acknowledgment to the originating user device (e.g., user device 102-1).

As shown by reference number 166, when the second message is intended for the destination user device (e.g., user device 102-L), the network exposure device (e.g., NEF 112) may determine a reachability of the destination user device. For example, the network exposure device may determine a reachability status of the destination user device, a time when the destination user device is reachable, a duration of time the destination user device is reachable, a reachability start time of the destination user device, a reachability end time of the destination user device, a schedule of when the destination user device is reachable and/or for how long, and/or the like. In some implementations, the network exposure device may determine the reachability of the destination user device based on the list of the plurality of user devices stored in the data structure (e.g., routing data structure 120). For example, the network exposure device may search for an entry concerning the destination user device in the list of the plurality of user devices and obtain the information concerning the reachability of the destination user device.

In some implementations, the network exposure device may determine at least one time during which the destination user device is reachable based on the reachability of the destination user device. In some implementations, the network exposure device may determine, based on the at least one time during which the destination user device is reachable, that the destination user device is not reachable and may send the first message to the data structure (e.g., routing data structure 120) for storage. For example, the network exposure device may determine that the destination user device is not currently reachable (e.g., user device 102-L is asleep, inactive, and/or the like) and cause the first message to be stored in the data structure until the destination user device is reachable again. In some implementations, the network exposure device may determine, based on the at least one time during which the destination user device is reachable, that the destination user device is reachable and obtain the first message from the data structure. For example, the network exposure device may determine that the destination user device is currently reachable (e.g., user device 102-L is awake, active, and/or the like) after a period of not being reachable, and obtain the first message from the data structure.

In some implementations, the network exposure device may determine (e.g., by searching the list of the plurality of user devices stored in the data structure) that the destination user device is not reachable and/or that the destination user device is not a valid and/or a registered user device. In some implementations, the network exposure device may send an error message to the originating user device (e.g., user device 102-1) via the message transmission device (e.g., SMSF 108), the access management network device (e.g., AMF 106-1) and/or the base station (e.g., gNB 104-1) associated with the originating user device.

As shown by reference number 168, the network exposure device may send (e.g., after determining that the destination user device is reachable) the second message to the message transmission device via the direct connection between the network exposure device and the message transmission device. In some implementations, the network exposure device may use the one or more components of the network exposure device, such as the SBI adaptor (e.g., SBI adaptor 114) and/or the SMS adaptor (e.g., SMS adaptor 116), to send the second message. For example, when the second message is a REST API message, the network exposure device may send the second message to the message transmission device using the SBI adaptor. As another example, when the second message is an SMS TPDU message, the network exposure device may send the second message to the message transmission device using the SMS adaptor. In some implementations, the network exposure device may convert the second message to a different format (e.g., as described elsewhere herein) before sending the second message to the message transmission device. For example, the network exposure device may convert the second message to a format that can be received, processed, and/or the like by the destination user device.

As shown by reference number 170, the message transmission device may send the second message to the destination user device (e.g., user device 102-L). For example, the message transmission device may send the second message to an access management network device associated with the destination user device (e.g., AMF 106-N), which may send the second message to a base station associated with the destination user device (e.g., gNB 104-M), which may send the second message to the destination user device. In some implementations, the destination user device may generate and send a response message to message transmission device and/or the network exposure device in a similar manner as described elsewhere herein (see e.g., FIG. 1C and reference numbers 140 and 142).

Additionally, or alternatively, as shown by reference number 172, the network exposure device (e.g., NEF 112) may determine that the second message is intended for the application network device (e.g., AF 122) (rather than the destination user device). For example, the originating user device may send the second message to the application network device to report an event experienced by the originating user device. In some implementations, the network exposure device may convert the second message to a different format before sending the second message to the application network device. In some implementations, the network exposure device may convert the second message to a format that may be sent to the application network device via the interface between the network exposure device and the application network device. For example, when the first message is an SMS TPDU message, a REST API message that includes an SMS TPDU message, and/or the like, the SMS adaptor (e.g., SMS adaptor 116) and/or the AF message handler (e.g., AF message handler 118) may process the first message to convert the first message into a T8 message (e.g., a message suitable for being transmitted via a T8 interface), a REST API message, an optimized REST API message (e.g., a REST API message where unnecessary information concerning the SMS TPDU message included in the REST API message has been removed), and/or the like.

As indicated above, FIGS. 1A-1F are provided merely as examples. Other examples can differ from what was described with regard to FIGS. 1A-1F. Further, the number and arrangement of devices and networks shown in FIGS. 1A-1F are provided as an example. In practice, there may be additional devices and/or networks, fewer devices and/or networks, different devices and/or networks, or differently arranged devices and/or networks than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) of example implementation 100 may perform one or more functions described as being performed by another set of devices of example implementation 100.

Figure 2:
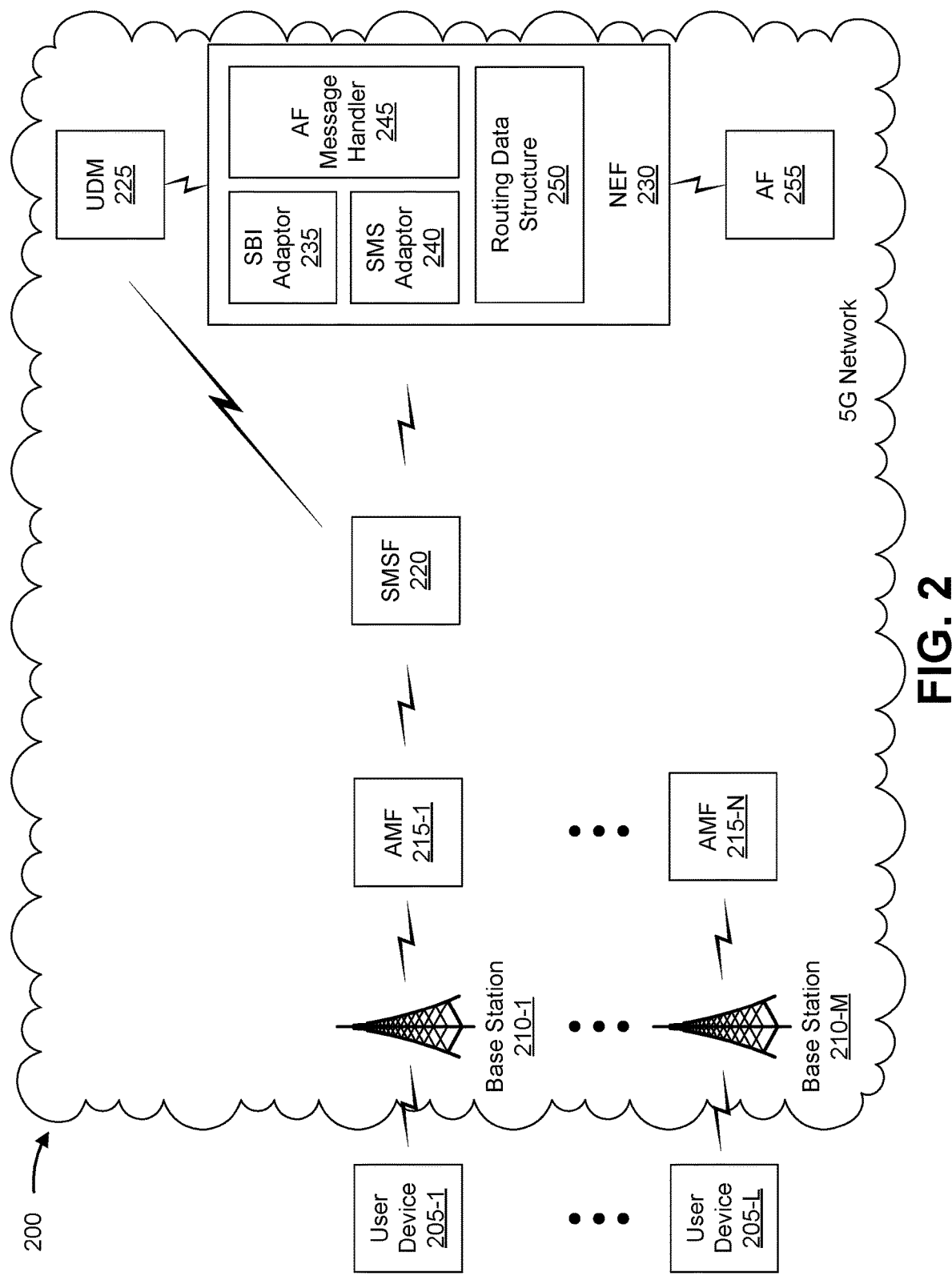
FIG. 2 is a diagram of an example environment in which systems and/or methods described herein may be implemented.

FIG. 2 is a diagram of an example environment 200 in which systems and/or methods, described herein, may be implemented. As shown in FIG. 2, environment 200 may include one or more user devices 205-1 through 205-L (L>1) (hereinafter referred to collectively as "user devices 205," and individually as "user device 205"), one or more base stations 210-1 through 210-M (M≥1) (hereinafter referred to collectively as "base stations 210," and individually as "base station 210"), one or more access and mobility management functions (AMFs) 215-1 through 215-N (N≥1) (hereinafter referred to collectively as "AMFs 215," and individually as "AMF 215"), a short message service (SMS) function (SMSF) 220, a unified data management (UDM) 225, a network exposure function (NEF) 230, a service based interface (SBI) adaptor 235, an SMS adaptor 240, an application function (AF) message handler 245, a routing data structure 250, and an application function (AF) 255. Devices of environment 200 may interconnect via wired connections, wireless connections, or a combination of wired and wireless connections.

User device 205 includes one or more devices capable of receiving, generating, storing, processing, and/or providing information, such as information described herein. For example, user device 205 may include a communication device, such as an Internet of Things (IoT) device (e.g., a category M1 (Cat-M1) device, a narrow band (NB) IoT device, and/or the like), a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device. In some implementations, user device 205 may generate information, such as a message, a paging response message, a response message, a delivery message, and/or the like, and send the information to AMF 215, SMSF 220, and/or NEF 230 via base station 210. In some implementations, the user device may receive information, such as a message, a paging request message, and/or the like, from AMF 215, SMSF 220, and/or NEF 230 via base station 210.

Base station 210 includes one or more devices capable of transferring traffic, such as audio, video, text, one or more messages, and/or other traffic, to or from user device 205 and/or AMF 215. In some implementations, base station 210 may include a small cell base station, such as a base station of a microcell, a picocell, and/or a femtocell. In some implementations, base station 210 may send traffic to and/or receive traffic from user device 205 via an air interface. In some implementations, base station 210 may include a gNB associated with a 5G network that receives traffic from and/or sends traffic to SMSF 220 via AMF 215.

AMF 215 includes one or more devices, such as one or more server devices, capable of managing authentication, activation, deactivation, and/or mobility functions associated with a user device 205 connected to the 5G network. In some implementations, AMF 215 may perform operations relating to authentication of user device 205. AMF 215 may perform operations associated with handing off user device 205 from a first base station 210 to a second base station 210 when user device 205 is transitioning from a first cell associated with the first base station 210 to a second cell associated with the second base station 210. Additionally, or alternatively, AMF 215 may select another AMF (not pictured), to which user device 205 should be handed off (e.g., when user device 205 moves out of range of AMF 215). In some implementations, AMF 215 may communicate with a user device 205 (e.g., via base station 210) to obtain information concerning a reachability of user device 205 and may send the information to NEF 230. In some implementations, AMF 215 may transfer traffic, such as audio, video, text, one or more messages, and/or other traffic, to or from user device 205 (e.g., via base station 210), SMSF 220, and/or NEF 230.

SMSF 220 includes one or more devices, such as one or more server devices, capable of facilitating transmission of messages, such as SMS messages, to and from user device 205, AMF 215, UDM 225, NEF 230, and/or AF 255. In some implementations, SMSF 220 may be connected to NEF 230 via a direct connection. In some implementations, SMSF 220 may receive a message and convert the message to a different format and send the message after converting the message. In some implementations, SMSF 220 may send a paging request to user device 205 and/or receive a paging response from user device 205.

UDM 225 includes one or more devices, such as one or more server devices, capable of registering and storing profile information associated with a user device 205 connected to the 5G network. In some implementations, UDM 225 may store information concerning at least one communication capability of user device 205. In some implementations, UDM 225 may send the information concerning the at least one communication capability of user device 205 to NEF 230.

NEF 230 includes one or more devices, such as one or more server devices, capable of exposing capabilities, events, information, and/or the like in the 5G network to help other devices in the 5G discover network resources and/or utilize network resources efficiently. In some implementations, NEF 230 may receive one or more messages from and/or send one or more messages to a user device 205 via AMF 215 and base station 210, and receive messages from and/or send messages to AF 255. In some implementations, NEF 230 may receive a message and convert the message to a different format and send the message after converting the message. In some implementations, NEF 230 may obtain a list of a plurality of user devices from AMF 215 and determine a reachability of user device 205 based on the list of the plurality of user devices. In some implementations, NEF 230 may obtain information concerning at least one communication capability of user device 205 from UDM 225.

SBI adaptor 235 includes one or more components of NEF 230. In some implementations, SBI adaptor 235 includes one or more network devices, such as one or more server devices, capable of receiving, generating, storing, processing (e.g., converting), and/or providing messages, such as messages described herein. In some implementations, SBI adaptor 235 may facilitate converting a message of a first format (e.g., an SMS format) to a second format (e.g., an SBI format).

SMS adaptor 240 includes one or more components of NEF 230. In some implementations, SMS adaptor 240 includes one or more network devices, such as one or more server devices, capable of receiving, generating, storing, processing (e.g., converting), and/or providing messages, such as messages described herein. For example, SMS adaptor 240 may facilitate transmitting a message received from an originating user device 205 to a destination user device 205 via AMF 215 and/or to AF 255. In some implementations, the SMS adaptor 240 may facilitate converting a message of a first format (e.g., an SBI format) to a second format (e.g., an SMS format).

AF message handler 245 includes one or more components of NEF 230. In some implementations, AF message handler 245 includes one or more network devices, such as one or more server devices, capable of receiving, generating, storing, processing (e.g., converting), and/or providing messages, such as messages described herein. For example, the AF message handler 245 may facilitate transmitting a message to or from AF 255.

Routing data structure 250 includes one or more components of NEF 230. In some implementations, routing data structure 250 includes one or more devices capable of receiving, generating, storing, processing, and/or providing information, such as information described herein. For example, routing data structure 250 may include a server device (e.g., a host server, a web server, an application server, etc.), a data center device, or a similar device. In some implementations, routing data structure 250 may store the list of the plurality of user devices, one or messages, and/or the like for retrieval by NEF 230.

AF 255 includes one or more devices capable of receiving, generating, storing, processing, and/or providing information, such as information described herein. For example, AF 255 may include a server device (e.g., a host server, a web server, an application server, etc.), a data center device, or a similar device. In some implementations, AF 255 may send information, such as a message, to NEF 230 and receive information, such as a message, a delivery message, and/or the like from NEF 230.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
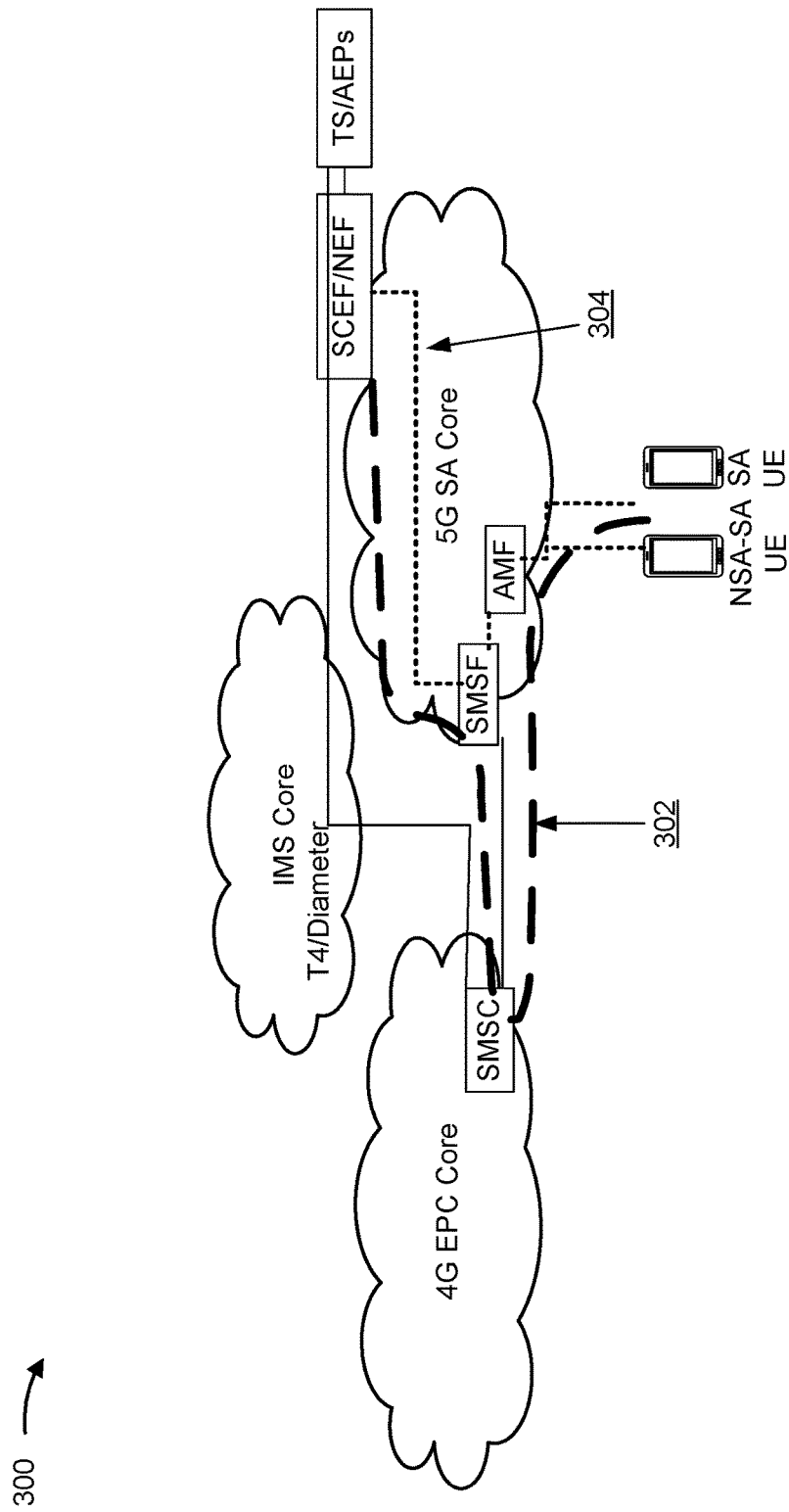
FIG. 3 is a diagram of an example environment illustrating at least one benefit of some implementations described herein.

FIG. 3 is a diagram of an example environment 300 illustrating at least one benefit of some implementations described herein. As shown in FIG. 3, an "indirect" message transmission path 302 (e.g., as currently implemented by some telecommunication system providers) for a message (e.g., an SMS message) transmitting from an originating user device (e.g., shown as an "NSA-SA UE" or an "SA UE") requires the message to be routed to an AMF and to an SMSF of a 5G telecommunications system (e.g., shown as "5G SA Core"), to an SMSC of a 4G telecommunications system (e.g., shown as "4G EPC Core"), and to a NEF (e.g., shown as "SCEF/NEF") of the 5G telecommunications system. In contrast, a "direct" message transmission path 304 (e.g., as provided by some implementations described herein) allows a message to be routed to an AMF, to an SMSF, and to a NEF of the 5G telecommunications system. In this way, the message can be directly routed through the same 5G telecommunications system without being routed to or from another telecommunications system.

As indicated above, FIG. 3 is provided merely as an example. Other examples can differ from what was described with regard to FIG. 3.

Figure 4:
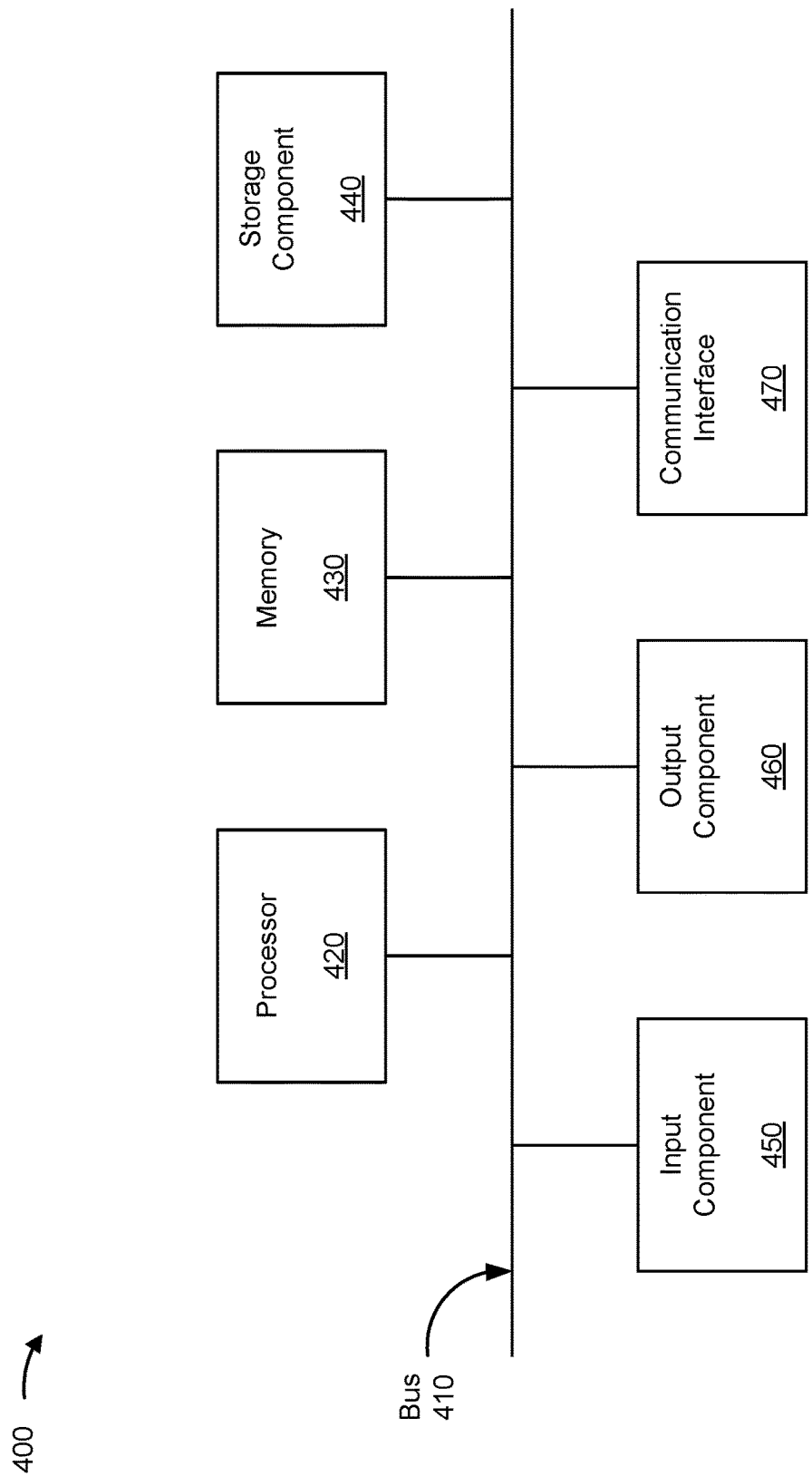
FIG. 4 is a diagram of example components of one or more devices of FIG. 2.

FIG. 4 is a diagram of example components of a device 400. Device 400 may correspond to user device 205, base station 210, AMF 215, SMSF 220, UDM 225, NEF 230, SBI adaptor 235, SMS adaptor 240, AF message handler 245, routing data structure 250, and/or AF 255. In some implementations, user device 205, base station 210, AMF 215, SMSF 220, UDM 225, NEF 230, SBI adaptor 235, SMS adaptor 240, AF message handler 245, routing data structure 250, and/or AF 255 may include one or more devices 400 and/or one or more components of device 400. As shown in FIG. 4, device 400 may include a bus 410, a processor 420, a memory 430, a storage component 440, an input component 450, an output component 460, and a communication interface 470.

Bus 410 includes a component that permits communication among the components of device 400. Processor 420 is implemented in hardware, firmware, or a combination of hardware and software. Processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 420 includes one or more processors capable of being programmed to perform a function. Memory 430 includes a random access memory (RAM), a read only memory (ROM), and/or another type of dynamic or static storage device (e.g., a flash memory, a magnetic memory, and/or an optical memory) that stores information and/or instructions for use by processor 420.

Storage component 440 stores information and/or software related to the operation and use of device 400. For example, storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 450 includes a component that permits device 400 to receive information, such as via user input (e.g., a touch screen display, a keyboard, a keypad, a mouse, a button, a switch, and/or a microphone). Additionally, or alternatively, input component 450 may include a sensor for sensing information (e.g., a global positioning system (GPS) component, an accelerometer, a gyroscope, and/or an actuator). Output component 460 includes a component that provides output information from device 400 (e.g., a display, a speaker, and/or one or more light-emitting diodes (LEDs)).

Communication interface 470 includes a transceiver-like component (e.g., a transceiver and/or a separate receiver and transmitter) that enables device 400 to communicate with other devices, such as via a wired connection, a wireless connection, or a combination of wired and wireless connections. Communication interface 470 may permit device 400 to receive information from another device and/or provide information to another device. For example, communication interface 470 may include an Ethernet interface, an optical interface, a coaxial interface, an infrared interface, a radio frequency (RF) interface, a universal serial bus (USB) interface, a wireless local area network interface, a cellular network interface, or the like.

Device 400 may perform one or more processes described herein. Device 400 may perform these processes based on processor 420 executing software instructions stored by a non-transitory computer-readable medium, such as memory 430 and/or storage component 440. A computer-readable medium is defined herein as a non-transitory memory device. A memory device includes memory space within a single physical storage device or memory space spread across multiple physical storage devices.

Software instructions may be read into memory 430 and/or storage component 440 from another computer-readable medium or from another device via communication interface 470. When executed, software instructions stored in memory 430 and/or storage component 440 may cause processor 420 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIGS. 5A-5B are diagrams of example call flows of example operations capable of being performed by one or more devices of FIG. 2 and/or one or more components of one or more devices of FIG. 2. For example, FIG. 5A is a diagram of an example call flow 500 for an application function (e.g., AF 255) to send a message to a destination user device (e.g., user device 205-1). As another example, FIG. 5B is a diagram of an example call flow 550 for an originating user device (e.g., user device 205-1) to send a message to an application function (e.g., AF 255).

As shown in FIG. 5A and by reference number 502, user device 205-1 may send a registration message to UDM 225 to provide information concerning user device 205-1, such as at least one communication capability of user device 205-1. As shown by reference number 504, AF 255 may send a message to NEF 230 in a similar manner as described herein in relation to FIG. 1B. As shown by reference number 506, NEF 230 may communicate with UDM 225 to determine a communication capability of user device 205-1 in a similar manner as described herein in relation to FIG. 1B. As shown by reference number 508, NEF 230 may process the message and determine to send the message to user device 205-1 via SMSF 220 (e.g., via a direct connection between NEF 230 and SMSF 220) in a similar manner as described herein in relation to FIG. 1B. As shown by reference number 510, NEF 230 may send the message to SMSF 220 in a similar manner as described herein in relation to FIG. 1B.

As shown by reference number 512, SMSF 220 may send a paging request to user device 205-1 and receive a paging response from user device 205-1 in a similar manner as described herein in relation to FIG. 1B. As shown by reference number 514, SMSF 220 may send the message to user device 205-1 in a similar manner as described herein in relation to FIG. 1C. As shown by reference number 516, NEF 230 may receive a response message from user device 205-1 in a similar manner as described herein in relation to FIG. 1C. As shown by reference number 518, NEF 230 may send an acknowledgment to user device 205-1 in a similar manner as described herein in relation to FIG. 1D. As shown by reference number 520, NEF 230 may send, based on the response message, a delivery message to AF 255 in a similar manner as described herein in relation to FIG. 1C.

As shown in FIG. 5B and by reference number 552, a user device 205-1 may send a registration message to UDM 225 to provide information concerning user device 205-1 in a similar manner as described herein in relation to FIG. 5A. As shown by reference number 554, user device 205-1 may decide to send a message in a similar manner as described herein in relation to FIG. 1E. As shown by reference number 556, user device 205-1 may send a message service request to NEF 230. NEF 230 may determine that NEF 230 is capable of receiving and/or transmitting a message from user device 205-1 and may grant the message service request.

As shown by reference number 558, user device 205-1 may send the message to NEF 230 in a similar manner as described herein in relation to FIG. 1E (e.g., via the direct connection between NEF 230 and SMSF 220). As shown by reference number 560, NEF 230 may process the message and determine that the message is intended for AF 255 in a similar manner as described herein in relation to FIG. 1E. As shown by reference number 562, NEF 230 may send the message to AF 255 in a similar manner as described herein in relation to FIG. 1F. As shown by reference number 564, NEF 230 may send an acknowledgment to user device 205-1 in a similar manner as described herein relation to FIG. 1F.

As indicated above, FIGS. 5A-5B are provided merely as examples. Other examples can differ from what was described with regard to FIGS. 5A-5B.

Figure 6:
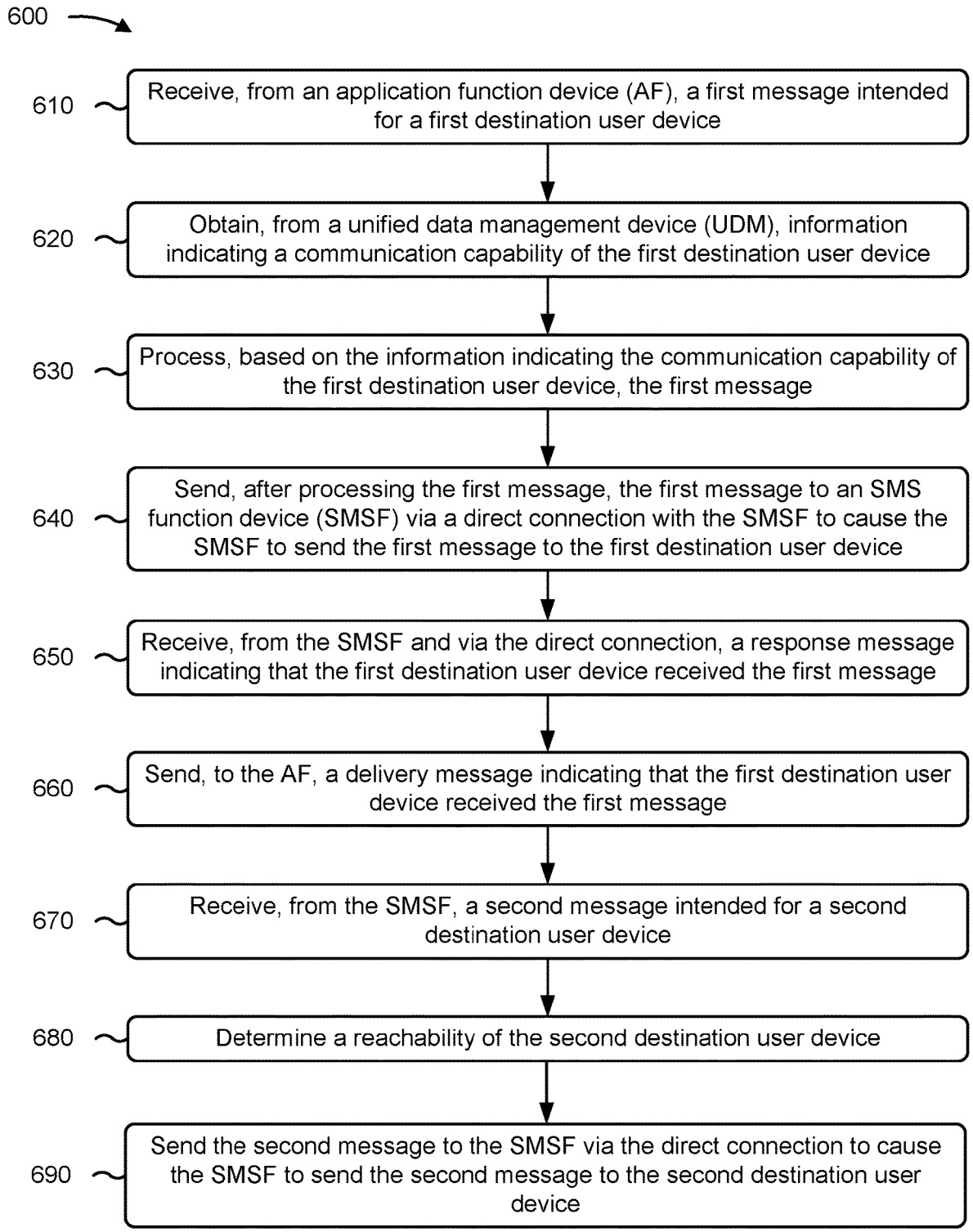
FIG. 6 is a flow chart of an example process for a method and device for communicating messages within a 5G network.

FIG. 6 is a flow chart of an example process 600 for communicating messages within a 5G network. In some implementations, one or more process blocks of FIG. 6 may be performed by a device, such as a network exposure function (e.g., NEF 230), and/or one or more components of the device, such as a service based interface (SBI) adaptor (e.g., SBI adaptor 235), a short message service (SMS) adaptor (e.g., SMS adaptor 240), an application function message handler (e.g., AF message handler 245), and/or a routing data structure (e.g., routing data structure 250). In some implementations, one or more process blocks of FIG. 6 may be performed by another device or a group of devices separate from or including the network exposure device, such as a user device (e.g., user device 205), a base station (e.g., base station 210), a network device, such as an access and mobility management function (e.g., AMF 215), an SMS function (e.g., SMSF 220), a unified data management (e.g., UDM 225), and/or an application function (e.g., AF 255). A device may perform one or more steps associated with a process block of FIG. 6 using processor 420, memory 430, storage component 440, input component 450, output component 460, communication interface 470, and/or the like of the device.

As shown in FIG. 6, process 600 may include receiving, from an application function device (AF), a first message intended for a first destination user device (block 610). For example, the network exposure device may receive, from an AF, a first message intended for a first destination user device, as described above. The network exposure device may receive the first message from the AF via an SBI between the network exposure device and the AF. In some implementations, the first message conforms to a first format, such as a service based interface (SBI) format, a representational state transfer (REST) application programming interface (API) format, and/or the like.

As further shown in FIG. 6, process 600 may include obtaining, from a unified data management device (UDM), information indicating a communication capability of the first destination user device (block 620). For example, the network exposure device may obtain, from a UDM, information indicating a communication capability of the first destination user device, as described above. The information indicating the communication capability may indicate that the first destination user device is capable of receiving messages that conform to a second format, such as a non-access stratum (NAS) format (e.g., a NAS SMS format), an SMS format, and/or the like. In some implementations, the network exposure device may send, to the UDM, information identifying the first destination user device and may receive, after sending the information identifying the first destination user device, the information indicating the communication capability of the first destination user device.

As further shown in FIG. 6, process 600 may include processing, based on the information indicating the communication capability of the first destination user device, the first message (block 630). For example, the network exposure device may process, based on the information indicating the communication capability of the first destination user device, the first message, as described above. In some implementations, the network exposure device may process the first message to cause the first message to conform to the second format (e.g., convert the first message from the first format to the second format).

As further shown in FIG. 6, process 600 may include sending, after processing the first message, the first message to an SMS function device (SMSF) via a direct connection with the SMSF to cause the SMSF to send the first message to the first destination user device (block 640). For example, the network exposure device may send, after processing the first message, the first message to an SMS function device (SMSF) via a direct connection between the network exposure device and the SMSF to cause the SMSF to send the first message to the first destination user device, as described above. The SMSF may send the first message to the first destination user device after the SMSF communicates with the first destination user device in accordance with a paging procedure. The direct connection may be a NAS interface, a REST API, and/or the like. In some implementations, the network exposure device may add the first message to a payload of a REST API message and send the REST API message to the SMSF via the direct connection.

In some implementations, the network exposure device may determine, before sending the first message to the SMSF via the direct connection, a location associated with the destination user device and may select, based on the location associated with the destination user device, the SMSF, from a plurality of SMFS, to receive the first message from the network exposure device.

As further shown in FIG. 6, process 600 may include receiving, from the SMSF and via the direct connection, a response message indicating that the first destination user device received the first message (block 650). For example, the network exposure device may receive, from the SMSF and via the direct connection, a response message indicating that the first destination user device received the first message, as described above. The response message may concern receipt of the message by the destination user device. In some implementations, the network exposure device may send, based on the response message, an acknowledgment to the SMSF via the direct connection to cause the SMSF to send the acknowledgment to the first destination user device.

As further shown in FIG. 6, process 600 may include sending, to the AF, a delivery message indicating that the first destination user device received the first message (block 660). For example, the network exposure device may send, to the AF, a delivery message indicating that the first destination user device received the first message, as described above. In some implementations, the delivery message indicates that the first message was successfully delivered to the destination user device.

As further shown in FIG. 6, process 600 may include receiving, from the SMSF, a second message intended for a second destination user device (block 670). For example, the network exposure device may receive, from the SMSF, a second message intended for a second destination user device, as described above. In some implementations, the second message conforms to the second format. In some implementations, the network exposure device may send, based on receiving the second message, an acknowledgment to the SMSF via the direct connection.

As further shown in FIG. 6, process 600 may include determining a reachability of the second destination user device (block 680). For example, the network exposure device may determine a reachability of the second destination user device, as described above. The network exposure device may determine a reachability status of the additional destination user device; determine a time when the additional destination user device is reachable; determine a duration of time the additional destination user device is reachable; determine a schedule of when the additional destination user device is reachable; determine a reachability start time of the additional destination user device; or determine a reachability end time of the additional destination user device.

In some implementations, the network exposure device may obtain, from an access and mobility management function device (AMF), a list of a plurality of user devices that indicates a respective reachability of at least one user device of the plurality of user devices and may determine, based on the list of the plurality of user devices, the reachability of the second destination user device.

As further shown in FIG. 6, process 600 may include sending the second message to the SMSF via the direct connection to cause the SMSF to send the second message to the second destination user device (block 690). For example, the network exposure device may send the second message to the SMSF via the direct connection between the network exposure device and the SMSF to cause the SMSF to send the second message to the second destination user device, as described above. The network exposure device may send the second message to the SMSF based on the reachability of the second destination user device. In some implementations, when the second message is an SMS transfer protocol data unit (TPDU) message, the network exposure device may convert the second message into a REST API message and send, after converting the second message into the REST API message, the second message to the SMSF via the direct connection to cause the SMSF to send the second message to the second destination user device.

Additionally, or alternatively, in some implementations, the second message is intended for the AF and the network exposure device may send second message to the AF. The network exposure device may convert the second message (e.g., from the second format to the first format, such from an NAS format to an SBI format) before sending the second message to the AF to allow the second message to be transmitted to and/or received by the AF.

Process 600 may include additional implementations, such as any single implementation or any combination of implementations described in connection with one or more other processes described elsewhere herein.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods, described herein, may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A network exposure function (NEF) device, comprising:
one or more processors configured to:
receive, from an application function (AF) device, a message intended for a destination user device, wherein the message does not conform to a short message service (SMS) format;
obtain, from a unified data management (UDM) device, information indicating a communication capability of the destination user device to receive messages that conform to the SMS format;
process, based on the information indicating the communication capability of the destination user device to receive messages that conform to the SMS format, the message to cause the message to conform to the SMS format;
add the message to a payload of a representational state transfer (REST) application programming interface (API) message;
send, after processing the message to cause the message to conform to the SMS format, the REST API message to an SMS function (SMSF) device via a direct connection between the NEF device and the SMSF device;
receive, from the SMSF device and via the direct connection, a response message indicating that the destination user device received the message; and
send, to the AF device, a delivery message indicating that the destination user device received the message.

2. The NEF device of claim 1, wherein, when obtaining the information indicating the communication capability of the destination user device to receive messages that conform to the SMS format, the one or more processors are configured to:
send, to the UDM device, information identifying the destination user device; and
receive, after sending the information identifying the destination user device, the information indicating the communication capability of the destination user device to receive messages that conform to the SMS format.

3. The NEF device of claim 1, wherein the direct connection between the NEF device and the SMSF device is a representational state transfer (REST) application programming interface (API).

4. The NEF device of claim 1, wherein the one or more processors are further configured to:
receive, from the SMSF device, an additional message intended for an additional destination user device, wherein the additional message conforms to the SMS format; and
send the additional message to the SMSF device via the direct connection between the NEF device and SMSF device to cause the SMSF device to send the additional message to the additional destination user device.

5. The NEF device of claim 1, wherein the one or more processors are further configured to:
receive, from the SMSF device, an additional message intended for an additional destination user device, wherein the additional message conforms to the SMS format;
determine a reachability of the additional destination user device; and
send, based on the reachability of the additional destination user device, the additional message to the SMSF device via the direct connection between the NEF and the SMSF device to cause the SMSF device to send the additional message to the additional destination user device.

6. The NEF device of claim 5, wherein, when determining the reachability of the additional destination user device, the one or more processors are configured to:
determine a reachability status of the additional destination user device;
determine a time when the additional destination user device is reachable;
determine a duration of time the additional destination user device is reachable;
determine a schedule of when the additional destination user device is reachable;
determine a reachability start time of the additional destination user device; or
determine a reachability end time of the additional destination user device.

7. The NEF device of claim 1, wherein the one or more processors are further configured to:
determine, before sending the message to the SMSF via the direct connection between the NEF and the SMSF, a location associated with the destination user device; and
select, based on the location associated with the destination user device, the SMSF, from a plurality of SMFS, to receive the message from the NEF.

8. A non-transitory computer-readable medium storing instructions, the instructions comprising:
one or more instructions that, when executed by one or more processors of a network exposure function (NEF) device, cause the one or more processors to:
receive, from an application function (AF) device, a message intended for a destination user device, wherein the message does not conform to a short message service (SMS) format;
obtain, from a unified data management (UDM) device, information indicating a communication capability of the destination user device to receive messages that conform to the SMS format;
process, based on the information indicating the communication capability of the destination user device to receive messages that conform to the SMS format, the message to cause the message to conform to the SMS format;
send, after processing the message to cause the message to conform to the SMS format, the message to an SMS function (SMSF) device via a direct connection between the NEF device and the SMSF device;
receive, from the SMSF device and via the direct connection, a response message indicating that the destination user device received the message;
send, to the AF device, a delivery message indicating that the destination user device received the message;
receive, from the SMSF device, an additional message intended for an additional destination user device; and
send the additional message to the SMSF device via the direct connection between the NEF device and SMSF device to cause the SMSF device to send the additional message to the additional destination user device.

9. The non-transitory computer-readable medium of claim 8, wherein the one or more instructions, that cause the one or more processors to obtain the information indicating the communication capability of the destination user device to receive messages that conform to the SMS format, cause the one or more processors to:
- send, to the UDM device, information identifying the destination user device; and
- receive, after sending the information identifying the destination user device, the information indicating the communication capability of the destination user device to receive messages that conform to the SMS format.

10. The non-transitory computer-readable medium of claim 8, wherein the direct connection between the NEF device and the SMSF device is a representational state transfer (REST) application programming interface (API).

11. The non-transitory computer-readable medium of claim 8, wherein the one or more instructions, that cause the one or more processors to send the message to the SMSF device via the direct connection between the NEF device and the SMSF device, cause the one or more processors to:
- add the message to a payload of a representational state transfer (REST) application programming interface (API) message; and
- send the REST API message to the SMSF device via the direct connection between the NEF device and the SMSF device.

12. The non-transitory computer-readable medium of claim 8, wherein the one or more instructions, that cause the one or more processors to send the additional message, cause the one or more processors to:
- determine a reachability of the additional destination user device; and
- send, based on the reachability of the additional destination user device, the additional message to the SMSF device via the direct connection between the NEF device and SMSF device to cause the SMSF device to send the additional message to the additional destination user device.

13. A method, comprising:
- receiving, by a network exposure function (NEF) device and from an application function (AF) device, a message intended for a destination user device,
  - wherein the message does not conform to a short message service (SMS) format;
- obtaining, by the NEF device and from a unified data management (UDM) device, information indicating a communication capability of the destination user device to receive messages that conform to the SMS format;
- processing, by the NEF device and based on the information indicating the communication capability of the destination user device to receive messages that conform to the SMS format, the message to cause the message to conform to the SMS format;
- adding, by the NEF device, the message to a payload of a representational state transfer (REST) application programming interface (API) message;
- sending, by the NEF device and after processing the message to cause the message to conform to the SMS format, the REST API message to an SMS function (SMSF) device via a direct connection between the NEF device and the SMSF device;
- receiving, by the NEF device, from the SMSF device, and via the direct connection, a response message indicating that the destination user device received the message; and
- sending, by the NEF device and to the AF device, a delivery message indicating that the destination user device received the message.

14. The method of claim 13, wherein obtaining the information indicating the communication capability of the destination user device to receive messages that conform to the SMS format comprises:
- sending, to the UDM device, information identifying the destination user device; and
- receiving, after sending the information identifying the destination user device, the information indicating the communication capability of the destination user device to receive messages that conform to the SMS format.

15. The method of claim 13, wherein the direct connection between the NEF device and the SMSF device is a representational state transfer (REST) application programming interface (API).

16. The method of claim 13, further comprising:
- receiving, from the SMSF device, an additional message intended for an additional destination user device,
  - wherein the additional message conforms to the SMS format; and
- sending the additional message to the SMSF device via the direct connection between the NEF device and SMSF device to cause the SMSF device to send the additional message to the additional destination user device.

17. The method of claim 13, further comprising:
- receiving, from the SMSF device, an additional message intended for an additional destination user device,
  - wherein the additional message conforms to the SMS format;
- determining a reachability of the additional destination user device; and
- sending, based on the reachability of the additional destination user device, the additional message to the SMSF device via the direct connection between the NEF and the SMSF device to cause the SMSF device to send the additional message to the additional destination user device.

18. The method of claim 17, wherein determining the reachability of the additional destination user device comprises one of:
- determining a reachability status of the additional destination user device;
- determining a time when the additional destination user device is reachable;
- determining a duration of time the additional destination user device is reachable;
- determining a schedule of when the additional destination user device is reachable;
- determining a reachability start time of the additional destination user device; or
- determining a reachability end time of the additional destination user device.

19. The method of claim 13, further comprising:
- determining, before sending the message to the SMSF via the direct connection between the NEF and the SMSF, a location associated with the destination user device; and selecting, based on the location associated with the destination user device, the SMSF, from a plurality of SMFS, to receive the message from the NEF.

20. The non-transitory computer-readable medium of claim 8, wherein the additional message conforms to the SMS format.

\* \* \* \* \*